United States Patent [19]
Beller

[11] Patent Number: 4,754,362
[45] Date of Patent: Jun. 28, 1988

[54] MAGNETICALLY LATCHING AND CURRENT SENSITIVE AUTOMATICALLY UNLATCHING SWITCH ASSEMBLY

[75] Inventor: Wilbert E. Beller, Park Ridge, Ill.

[73] Assignee: Eaton Corporation, Cleveland, Ohio

[21] Appl. No.: 837,450

[22] Filed: Mar. 7, 1986

[51] Int. Cl.[4] .............................................. H02H 7/08

[52] U.S. Cl. ...................................... 361/31; 335/256; 361/93; 361/187

[58] Field of Search ....................... 335/254, 253, 256; 361/23, 31, 32, 187, 190-194, 143, 160, 170, 93

[56] References Cited

U.S. PATENT DOCUMENTS

| | | | |
|---|---|---|---|
| 3,456,125 | 7/1969 | Cousin et al. | 361/187 X |
| 3,683,239 | 8/1972 | Sturman | 361/194 |
| 3,737,736 | 6/1973 | Stampfi | 361/194 X |
| 4,227,231 | 10/1980 | Hansen et al. | 361/194 X |
| 4,263,928 | 4/1981 | Kobayashi | 361/194 |
| 4,451,865 | 5/1984 | Warner et al. | 361/194 |
| 4,489,360 | 12/1984 | Kraicar et al. | 361/187 |
| 4,532,570 | 7/1985 | Thornley et al. | 361/194 |

*Primary Examiner*—A. D. Pellinen
*Assistant Examiner*—Jeffrey A. Gaffin
*Attorney, Agent, or Firm*—R. A. Johnston

[57] ABSTRACT

A magnetically latching switch assembly adapted for use with a motor including first and second serially connected coils wound around a frame to generate oppositely directed magnetic flux through the frame. The coils are arranged so that for the normal run current of the motor, the net magnetic flux is sufficient to magnetically latch the switch against the restoring force of a spring. When the motor is stalled, the increased current is sensed and a portion of the current is diverted from one of the coils to reduce the net magnetic flux and terminate the latching effect. Current sensing and diverting is accomplished by a diode connected across the one coil.

4 Claims, 2 Drawing Sheets

MAGNETICALLY LATCHING AND CURRENT SENSITIVE AUTOMATICALLY UNLATCHING SWITCH ASSEMBLY

DESCRIPTION

BACKGROUND OF THE INVENTION

This invention relates to an electrical switch assembly and, more particularly, to such an assembly which may be used in an automobile to automatically control the raising or lowering of a window to an extreme position thereof in response to a momentary operation of the switch assembly actuator button.

In an automobile having motor driven windows, it is often desired to drive a window to an extreme position, either fully opened or fully closed. This of course may be accomplished by the operator continuously operating the window switch. However, it would be desirable to provide a switch assembly wherein only a single momentary operation of the switch assembly actuator button is required to cause the motor to be driven to an extreme position. It is therefore a primary object of the present invention to provide a switch assembly having such capability.

In the past, it has been proposed to implement this function in a number of different ways. A straightforward approach is to utilize limit switches for sensing travel of the window to an extreme position. This approach is unsatisfactory in that it requires additional parts, thereby significantly increasing the cost. Other approaches have utilized the principle that the motor will stall when the window reaches its extreme position, which results in an increase in the motor current. Some of these approaches have included circuitry for sensing the motor current and opening the current path when the motor current exceeds a predetermined threshold. Again, this is disadvantageous in that it requires additional circuitry which increases the cost. Still other approaches have utilized a bi-metallic element which opens the switch when it is heated by excessive motor current flowing therethrough. This too is disadvantageous because the bi-metallic element is sensitive to ambient temperature and cannot be operated repeatedly without a cool down period between operations. Yet another approach is to use a magnetic latch in conjunction with a timing circuit where the timer is set to time an interval greater than that required to drive the window to its extreme position, at the end of which interval the latch is deenergized. This approach is disadvantageous due to its complexity and cost. It is therefore another object of the present invention to provide a switch assembly without any of the noted disadvantages.

It is a further object of this invention to provide such a switch assembly which is small and self contained so that it does not require additional wire harnesses.

It is yet another object of the present invention to provide such a switch assembly which is automatically unlatched upon the removal of power so that the window drive is not energized when power is initially applied.

It is yet another object of the present invention to provide such a switch assembly which is also sensitive to the window being inadvertently stopped by an obstruction at some middle position.

SUMMARY OF THE INVENTION

The foregoing, and additional, objects are additional in accordance with the principles of this invention by providing a switch assembly which is electromagnetically latched. The latch includes a frame having first and second coils wound thereabout. The coils are connected in series so that current passing through the coils causes the coils to produce oppositely directed magnetic flux in the frame. The coils are arranged so that, for a given current, the first coil generates a greater magnetic flux than the second coil and the net magnetic flux generated in response to the normal motor running current is sufficient to provide a latching effect for the switch. Means are provided which are responsive to the motor current exceeding a predetermined threshold for diverting a portion of the current from the first coil while allowing it to pass through the second coil so as to reduce the net magnetic flux and terminate the latching effect.

In accordance with an aspect of this invention, the diverting means includes a diode connected across the first coil and poled in the direction of the current.

BRIEF DESCRIPTION OF THE DRAWINGS

The foregoing will be more readily apparent upon reading the following description in conjunction with the drawings in which like elements in different figures thereof have the same reference character applied thereto to and wherein.

DETAILED DESCRIPTION

Figure 5:
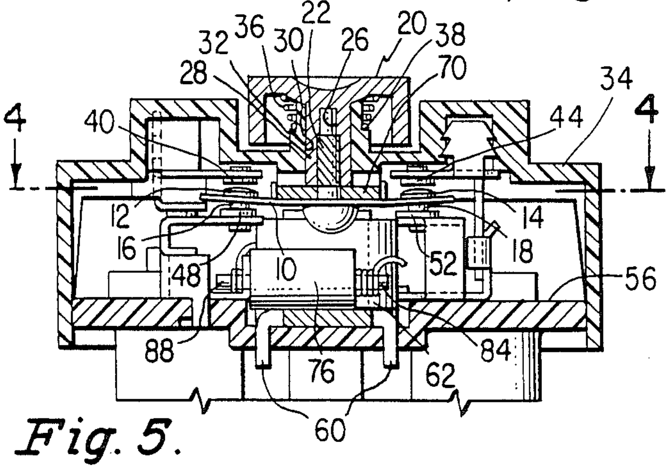
FIG. 5 is a cross sectional view taken substantially along the line 5—5 in FIG. 4.
Figure 6:
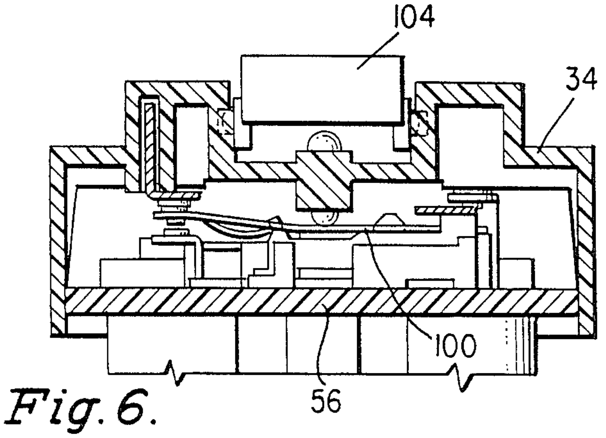
FIG. 6 is a cross sectional view taken substantially along the line 6—6 in FIG. 4.
Figure 8:
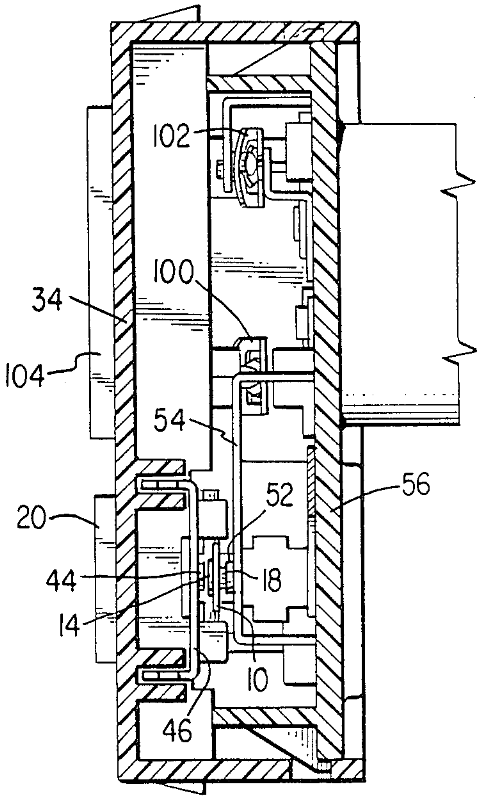
FIG. 8 is a cross sectional view taken substantially along the line 8—8 in FIG. 4.

Referring now to the drawings, the latching switch assembly according to the present invention includes a movable switch blade 10 having, illustratively, four switch contacts 12, 14, 16 and 18 thereon. The switch blade 10 is affixed to the movable actuator button 20 by means of the knurled pin 22 which extends through the hole 24 of the switch blade 10 and into the bore 26 provided therefor in the boss 28 which is molded as part of the button 20. The pin 22 and the bore 26 are sized to provide for a press fit engagement therebetween. As is shown in FIG. 5, the boss 28 is inserted through the bore 30 of the boss 32 molded as part of the cover 34 of the overall switch unit. Clearance is provided between the outside of the boss 28 and the bore 30 so that the actuator button 20 is free to move with respect to the cover 34. A spring 36 has one end resting on the shoulder 38 of the boss 32 and its other end bearing against the underside of the actuator button 20 so as to provide a resiliently yieldable biasing force on the button 20 in a direction to move the button 20 away from the cover 34.

To cooperate with the switch contact 12, there is provided a fixed contact 40 mounted on the bus bar 42. To cooperate with the switch contact 14, there is provided a fixed contact 44 mounted on the bus bar 46. To cooperate with the switch contact 16, there is provided a fixed contact 48 mounted on the bus bar 50. To cooperate with the switch contact 18, there is provided a fixed contact 52 mounted on the bus bar 54. The bus bars 42 and 46 are supported by the cover 34 of the switch unit and the bus bars 50 and 54 are supported on the base 56 of the switch unit, as shown in FIG. 5. Accordingly, due to the action of the spring 36, the switch blade 10 is biased away from the fixed contacts 48 and 52 and normally bridges the fixed contacts 40 and 44.

To effect the latching function, there is provided a magnetic frame, illustratively a U-shaped ferromagnetic yoke member 58 having legs 60 for securing the yoke member 58 on the base 56. A first coil of wire 62 is wound about an arm 64 of the yoke member 58 and a second coil of wire 66 is wound about the other arm 68 of the yoke member 58. The coils 62 and 66 are wound about their respective arms 64 and 68 in appropriate directions so that current passing serially through the coils 62 and 66 generates oppositely directed magnetic flux in the yoke 58. A ferromagnetic latch plate 70 is provided to cooperate with the ends of the yoke arms 64 and 68 to complete a magnetic circuit when the coils 62 and 66 are energized. The latch plate 70 is provided with a centrally located hole 72 sized to accommodate the pin 22 therethrough. The latch plate 70 is positioned between the switch blade 10 and the boss 28 so that, when assembled, the actuator button 20, the latch plate 70, the switch blade 10 and the pin 22 move together. The upstanding tabs 74 on the switch blade 10 prevent relative rotation between the switch blade 10 and the latch plate 70. To provide the current sensitive unlatching function, there is provided a diode 76 having its anode 88 supported by the bifurcated tab 78 of the bus bar 94. The first end 80 of the first coil 62 and the first end 82 of the second coil 66 are connected together and to the cathode 84 of the diode 76. The second end 86 of the first coil 62 is connected to the anode 88 of the diode 76. The second end 90 of the second coil 66 is connected to the tab 92 of the bus bar 50, and hence to the fixed contact 48.

Figure 2:
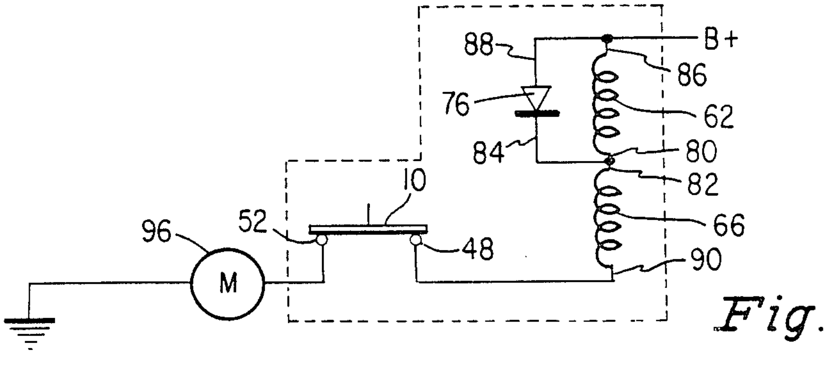
FIG. 2 is a simplified electrical schematic circuit diagram illustrating the operation of the latching switch assembly.
Figure 4:
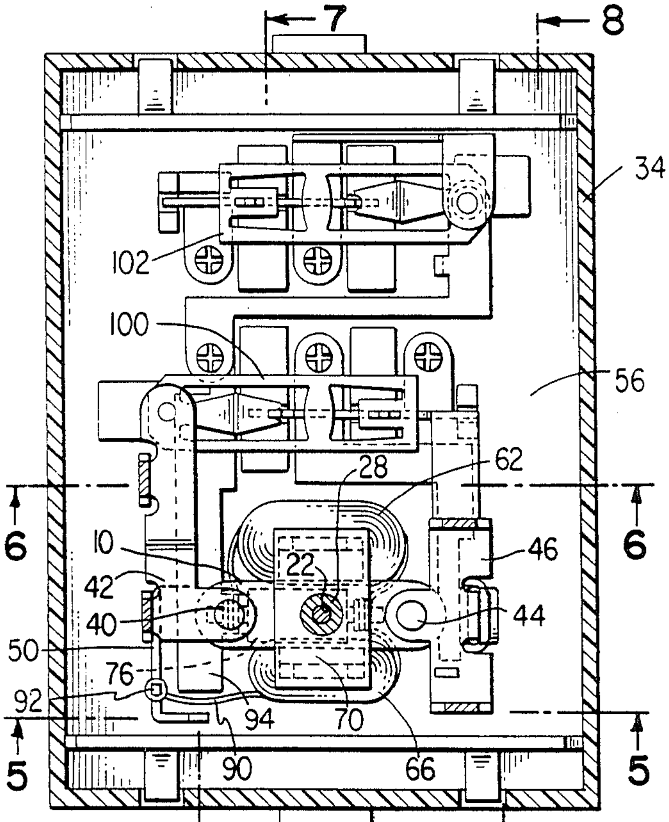
FIG. 4 is a top plan view, with the cover removed, and taken substantially along the line 4—4 in FIG. 5, of a switch unit incorporating the latching switch assembly shown in FIG. 1 and two momentary contact switches for implementing the circuit shown in FIG. 3.
Figure 7:
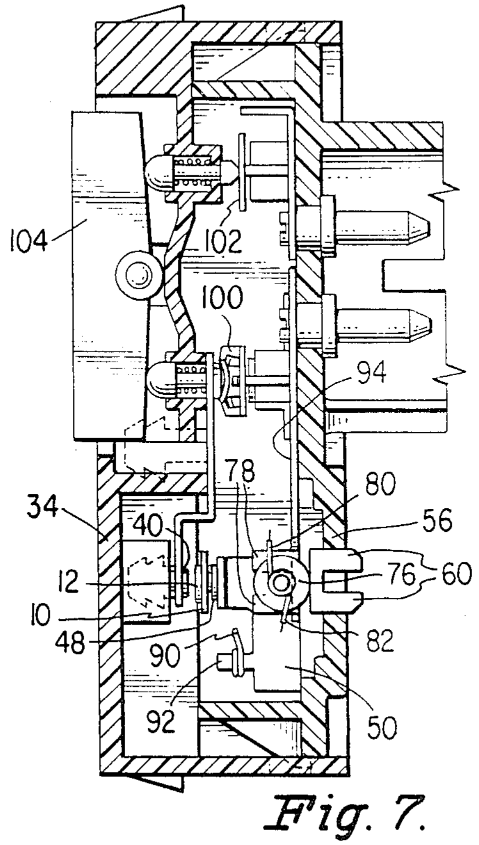
FIG. 7 is a cross sectional view taken substantially along the line 7—7 in FIG. 4.

FIG. 2 illustrates the operation of this latching/unlatching switch assembly. As shown therein, the connection of the first coil 62 and the anode 88 of the diode 76 on the bus bar 94 is to the positive battery supply. The fixed contact 52 is connected to one side of the motor 96, the other side of which is connected to ground. When the actuator button 20 is depressed so that the switch blade 10 bridges the contacts 48 and 52, current flows through the coils 62 and 66 and through the motor 96. The coils 62 and 66 are so arranged that when the normal motor run current flows therethrough, more magnetic flux is generated by the coil 62; but at the same time, the net magnetic flux generated by the coils 62 and 66 is sufficient to create a magnetic attractive force between the yoke member 58 and the latch plate 70 that overcomes the restoring force of the spring 36. Accordingly, the switch blade 10 continues to bridge the contacts 48 and 52. The normal running current to the motor 96 through the coil 62 generates a voltage drop across the coil 62 which is insufficient to cause the diode 76 to fully conduct. In the case where the motor 96 is used to move an automobile window, when the window reaches its extreme position so that it can no longer be moved, the motor 96 stalls, causing an increase in the current. This increased current through the coil 62 creates an increased voltage drop across the coil 62 and the diode 76 which causes the diode 76 to more fully conduct. Accordingly, a large portion of the motor stall current is diverted from the coil 62 to the diode 76. However, all of the motor stall current continues to pass through the coil 66. This causes a decrease in the net magnetic flux in the yoke 58. This decrease in the net magnetic flux results in a decrease in the magnetic attractive force between the yoke 58 and the latch plate 70. Accordingly, the restoring force of the spring 36 overcomes the magnetic attractive force, causing the switch blade 10 to be separated from the contacts 48 and 52, opening the circuit to the motor 96.

By way of example, if the coil 62 is wound with fifty turns of number 23 awg wire, it has a resistance of 0.097 ohms; and if the coil 66 is wound with twenty-five turns of number 23 awg wire, it has resistance of 0.040 ohms. Illustratively, the motor 96 has a run current of 3.5 amps and a stall current of 15 amps. An illustrative diode 76 is a type 1N5820 Schottky barrier rectifier manufactured by Motorola. With such an arrangement, it has been found that at the motor run current sufficient magnetic flux is generated that the latch will hold a 1¼ lb. load. At a motor current of 14 amps, there is no net magnetic flux. At some point in between, the net magnetic flux is insufficient to overcome the force of the spring 36. This point is at approximately 11 amps of motor current. Accordingly, the latch will release when the motor is mechanically stopped, but before the motor current increases to a damaging level.

Figure 3:
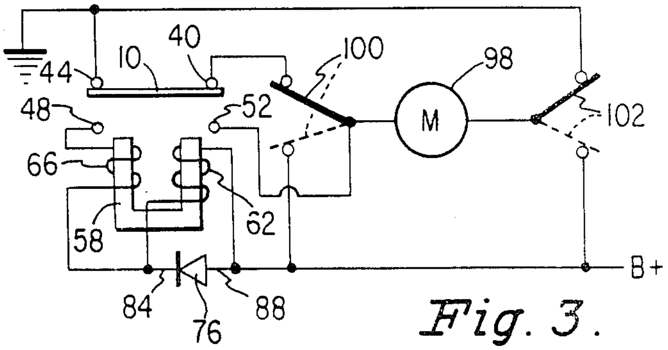
FIG. 3 is a simplified electrical schematic circuit diagram showing one latch switch and two momentary switches for controlling a DC reversible motor.

FIG. 3 illustrates the latching switch assembly described hereinabove when used with a reversible motor 98 and a momentary contact switch 100 for driving the motor 98 in a first direction and a momentary contact switch 102 for driving the motor 98 in a second direction. In this arrangement, the latching switch assembly is operative to drive the motor 98 in the first direction until it reaches a stall condition. The switches 100 and 102 are normally as shown by the respective solid lines but by momentary operation thereof may be moved to the positions shown by the respective broken lines. Thus, in the normal unoperated condition shown in FIG. 3, there is no current through the motor 98. If the switch 102 is momentarily operated, current flows from the positive supply, through the switch 102 as long as it is operated, to the left through the motor 98, through the switch 100, to the contact 40, through the switch blade 10, to the contact 44, and the ground, momentarily driving the motor 98 in a first direction. If the switch 100 is momentarily operated, current flows from the positive supply, through the switch 100 as long as it is operated, through the motor 98 to the right, through the switch 102, and to ground, momentarily driving the motor 98 in a second direction. When the latching switch assembly is energized, current flows from the positive supply, through the coil 62, through the coil 66, to the contact 48, through the switch blade 10, to the contact 52, through the motor 98 to the right, through the switch 102, and to ground, driving the motor in the second direction until it stalls, at which time the current path is broken, as previously described.

Figure 1:
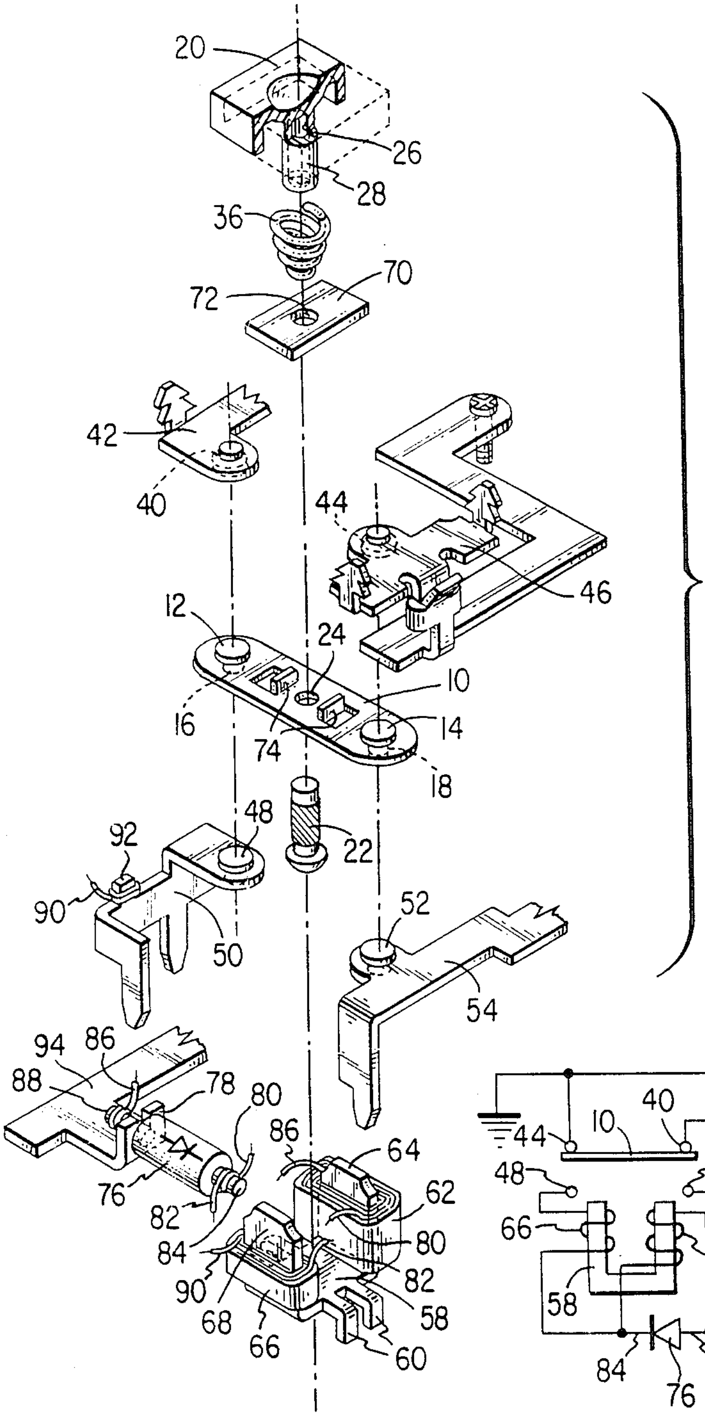
FIG. 1 is an exploded perspective view of a latching switch assembly constructed in accordance with the principles of this invention.

FIGS. 4–8 illustrate a switch unit for implementing the circuit shown in FIG. 3. This switch unit includes the latching switch assembly illustrated in FIG. 1 and the two momentary contact switches 100 and 102, which are illustratively of the snap acting type disclosed in U.S. Pat. No. 3,189,703. The momentary contact switches 100 and 102 are controlled by a rocker actuator 104. The construction of these momentary contact switches 100 and 102 does not form a part of the present invention. It is understood that although the switch unit disclosed in FIGS. 4–8 only includes one latching switch assembly, it is contemplated that it could be constructed with two latching switch assemblies and two momentary contact switches, with a respective pair comprising a latching switch assembly and a momentary contact switch for driving the motor in a respective direction. It is also contemplated that the disclosed latching switch assembly can be constructed to cooperate with a momentary switch such that initial travel of the actuator only causes closing of the momentary switch and that subsequent overtravel of the actuator causes actuation of the latching switch assembly. It is further contemplated that the latching switch assembly can be constructed with two latching switches which cooperate with a single electromagnetic latch.

Accordingly, there has been disclosed an improved magnetically latching and current sensitive automatically unlatching switch assembly. It is understood that the above-described embodiment is merely illustrative of the application of the principles of this invention. Numerous other embodiments may be devised by those skilled in the art without departing from the spirit and scope of this invention as defined by the appended claims.

I claim:

1. A switch assembly comprising:

a movable switch blade having a contact thereon;

a fixed switch contact;

an actuator operatively connected to effect movement of said switch blade;

means operative to provide a resiliently yieldable biasing force on said actuator in a direction to separate said switch blade contact from said switch contact; and latch means operative to provide a force to overcome said biasing force and maintain said switch blade contact and said fixed switch contact in engagement after an initial movement of said actuator places said contacts in engagement, said latch means being operative while the current through said switch blade is less than a predetermined threshold, said latch means including:

a ferromagnetic member coupled to said switch blade for movement therewith;

a ferromagnetic frame;

a first coil of wire wound around on said frame;

a second coil of wire wound around said frame;

means for connecting said first and second coils in series so that current passing through said coils causes said coils to produce oppositely directed magnetic flux in said frame;

circuit means operative to provide, upon connection to a source of power, a series current flow through said switch blade and said coils when said switch blade contact and said fixed switch contact are engaged, said coils being arranged that when said current flows through said coils said first coil generates a greater magnetic flux than said second coil so that the net magnetic flux is sufficient to create a magnetic attractive force between said frame and said ferromagnetic member sufficient to overcome said biasing force and maintain said switch blade contact and said fixed switch contact in engagement; and means responsive to said current through said switch blade exceeding said predetermined threshold for diverting a portion of said current from only said first coil to reduce the net magnetic flux so that said magnetic attractive force is less than said biasing force, whereupon said switch blade contact is separated from said fixed switch contact.

2. The switch assembly according to claim 1 wherein said diverting means includes a diode connected across said first coil and poled in the direction of the current.

3. A latching switch assembly for use with a DC motor to provide a current path for the motor under a normal run condition of the motor and to interrupt the current path in response to a stall condition of the motor which results in a current increase, comprising:

a movable switch blade having a contact thereon;

a fixed switch contact;

means applying a force biasing said switch blade in a direction away from said fixed contact;

an actuator operatively connected to effect movement of said switch blade;

latch means operative to provide a force to overcome said biasing force and maintain said switch blade contact and said fixed switch contact in engagement after an initial movement of said actuator places said contacts in engagement, said latch means being operative when the current through said switch blade is less than a predetermined threshold and inoperative when a current through said switch blade is at or above said threshold, including:

a ferromagnetic member coupled to said switch blade for movement therewith;

a ferromagnetic frame;

a first coil of wire wound around said frame;

a second coil of wire wound around said frame;

circuit means for connecting said first and second coils in series so that current passing through said coils causes said coils to produce oppositely directed magnetic flux in said frame;

means for providing a series current path through said switch blade and said coils when said switch blade contact and said fixed switch contact are engaged, said coils being arranged that when the current through said coils is equal said first coil generates a greater magnetic flux than said second coil so that at the normal run current of a motor the net magnetic flux is sufficient to create a magnetic attractive force between said frame and said ferromagnetic member sufficient to overcome said biasing force and maintain said switch blade contact and said fixed switch contact in engagement; and a diode connected across said first coil and poled in the direction of the current to divert a portion of said current from only said first coil, said portion increasing as the current increases from said normal run current so as to reduce the net magnetic flux until at said predetermined threshold of current the magnetic attractive force is less than said biasing force, at which point said switch blade contact is separated from said switch contact to interrupt the current path.

4. The latching switch assembly as defined in claim 3, wherein said ferromagnetic frame has a generally U-shaped configuration with said first coil wound around one leg of said frame and said second coil wound around the opposite leg of said frame.

* * * * *